US 9,726,275 B2

(12) United States Patent
Hwang et al.

(10) Patent No.: US 9,726,275 B2
(45) Date of Patent: Aug. 8, 2017

(54) SHIFT LEVER OF AUTOMOTIVE TRANSMISSION (71) Applicant: SL Corporation, Daegu (KR)

(72) Inventors: Yunje Hwang, Sterling Heights, MI (US); Seok Kang, Sterling Heights, MI (US)

(73) Assignee: SL Corporation, Daegu (KR)

( * ) Notice: Subject to any disclaimer, the term of this patent is extended or adjusted under 35 U.S.C. 154(b) by 364 days.

(21) Appl. No.: 14/575,605

(22) Filed: Dec. 18, 2014

(65) Prior Publication Data
US 2016/0178051 A1 Jun. 23, 2016

(51) Int. Cl.
*F16H 59/02* (2006.01)
*F16H 59/10* (2006.01)

(52) U.S. Cl.
CPC ....... *F16H 59/0278* (2013.01); *F16H 59/105* (2013.01)

(58) Field of Classification Search
CPC ........................... F16H 59/105; F16H 59/0278
See application file for complete search history.

(56) References Cited

U.S. PATENT DOCUMENTS

| 2010/0013621 A1* | 1/2010 | Kazyaka | B60Q 3/046 340/456 |
| 2012/0000311 A1* | 1/2012 | Shioji | B60K 20/04 74/473.3 |
| 2013/0298712 A1* | 11/2013 | Moon | F16H 59/0278 74/473.3 |

FOREIGN PATENT DOCUMENTS

| FR | 2707721 A1 * | 1/1995 | ......... F16H 59/0217 |
| JP | 2002362177 A | 12/2002 | |
| JP | 2011246089 A | 12/2011 | |
| KR | 10-0628626 | 9/2006 | |
| KR | 10-2014-0034550 | 3/2014 | |
| KR | 10-1384534 B1 | 4/2014 | |

* cited by examiner

*Primary Examiner* — Terence Boes
(74) *Attorney, Agent, or Firm* — Mintz Levin Cohn Ferris Glovsky and Popeo, P.C.; Kongsik Kim; Carolina Säve (57) ABSTRACT

A shift lever for a vehicle is provided that includes a knob and a rod which is detachably coupled to the knob in a one touch manner. A first connector and a second connector are disposed at the knob and the rod, respectively, and electrically connected to each other when the knob and the rod are coupled. The first connector is installed in the knob, and the second connector is detachably fixed at a tip side of the rod. A connector housing detachably fixes the second connector at the tip side of the rod, and a conductive member which has a first end fixed to the second connector, and is inserted and accommodated into the rod.

11 Claims, 9 Drawing Sheets

SHIFT LEVER OF AUTOMOTIVE TRANSMISSION

TECHNICAL FIELD

The present invention relates to a shift lever of an automotive transmission, and more particularly, to a shift lever of an automotive transmission that reduces working time by simplifying an assembly process when a shift lever is assembled to an automotive transmission.

BACKGROUND

In general, an automotive transmission is configured to change a gear ratio to uniformly maintain rotation of an engine based on a speed of a vehicle, and a driver manipulates a shift lever of the transmission to change the gear ratio of the transmission. For types gear shift modes of the transmission, there are a manual gear shift mode in which the driver may change gear shift stages, and an automatic gear shift mode in which the gear shift stage is automatically changed based on with the speed of the vehicle when the driver selects a driving mode (D).

In addition, in a sport mode type transmission in which a manual gear shift operation and an automatic gear shift operation may be performed in a single transmission is used, and the sport mode type transmission may perform the automatic gear shift operation and the manual gear shift operation when the driver increases or decreases a gear shift level, or perform a gear shift operation by providing a transmission, which may perform an automatic gear shift operation, at a side of a transmission that performs a manual gear shift operation.

The automotive transmission has a shift lock function called a function of locking a gear shift which has been developed to prevent a sudden unintended acceleration. A primary shift lock function prevents the shift lever from being moved to another position when the driver does not engage a brake pedal when the gear shift stage of the shift lever is a park "P"-stage or a neutral "N"-stage. In addition, a secondary shift lock function \ prevents the shift lever from being moved to a reverse "R"-stage when the vehicle travels forward at a predetermined speed or greater. To prevent an erroneous manipulation by the driver, a full shift lock function, which performs the shift lock function for all of the gear shift stages, may be implemented.

Therefore, the driver needs to release the shift lock function to select the gear shift stage using the shift lever, and in general, a release button for releasing the shift lock function is installed on a knob at one end of the shift lever. When the driver moves the knob, the shift lever is moved in one direction to select the gear shift stage, and the driver moves the knob while pressing the release button installed on the knob. In particular, for the driver to release the shift lock function when the driver presses the release button, a structure, which transmits an electrical signal based on whether the release button is manipulated, is required.

Therefore, to transmit an electrical signal based on whether the release button is manipulated, connectors, which are formed on the knob and a rod of the shift lever, respectively, are connected to each other when the knob and the rod of the shift lever are connected, to allow the electrical signal to be transmitted. However, with such a structure, the overall working time increases as assembly processes such as a process of mechanically coupling the knob and the rod, and a process of connecting the connectors for electrical connection are added.

Further, a risk increases that a printed circuit board may be damaged due to the occurrence of static electricity during a process of connecting the connectors to electrically connect the knob and the rod to each other, and particularly, the connectors may be assembled erroneously, and damaged due to the erroneous assembly.

SUMMARY

The present invention provides a shift lever of an automotive transmission, in which during a process of assembling a shift lever by coupling a knob and a rod, connecting terminals of connectors, which are formed at the knob and the rod, respectively, may be mechanically coupled and electrically connected to each other without a separate additional process, thereby simplifying overall processes of assembling and disassembling the shift lever.

In addition, the present invention provides a shift lever of an automotive transmission, in which a knob and a rod may be simultaneously mechanically and electrically coupled to each other by being assembled in a one touch manner, thereby simplifying overall processes of assembling and disassembling the shift lever.

The present invention also provides a shift lever of an automotive transmission, in which a rod side conductive member, which is electrically connected with a knob side board, may be configured as a flexible type, and the flexible type conductive member may be positioned in the rod when the flexible type conductive member is penetratingly inserted into the rod, such that the flexible conductive member may be protected, spatial utilization in the shift lever may be improved, and as a result, assembly property of the shift lever may be improved.

Technical problems of the present invention are not limited to the aforementioned technical problems, and other technical problems, which are not mentioned above, may be clearly understood by those skilled in the art from the following descriptions.

An exemplary embodiment of the present invention provides a shift lever of an automotive transmission that may include: a knob; a rod coupled to the knob; a first connector is installed in the knob; a second connector fixed at a tip side of the rod; a connector housing configured to couple the second connector at the tip side of the rod; and a conductive member having a first end fixed to the second connector, and inserted and accommodated into the rod.

The conductive member may be a board made of a flexible material. The rod may be formed in an annular bar shape having a hollow portion.

The shift lever may further comprise an elastic member is disposed on the knob and a notch groove into which a first end of the elastic member is inserted and fixed is formed in the rod. The first end of the elastic member may be (fixedly) coupled to the knob.

The shift lever may further comprise an accommodating groove into which the rod is inserted and accommodated is formed in the knob, a guide rib formed on the accommodating groove, and a guide slit into which the guide rib is inserted is formed in the rod.

In some embodiments, the connector housing may include a guide groove to which the second connector is inserted, and a fastener extended in one direction from the body, and attached and detached to the rod.

The shift lever may further comprise a locating projection protrudes outward and is formed on an outer surface of the connector housing, and a locating groove into which the locating projection is inserted is formed in the rod.

The shift lever may further comprise a guide rail, which corresponds to the guide groove, is formed on an outer surface of the second connector.

The shift lever may further comprise a coupling projection extended outward and formed on the fastener and a coupling aperture into which the coupling projection is inserted and fixed is formed in the rod.

In some embodiments, an inclined surface may be formed on the first side wall portion.

The shift lever may further comprise a guide member disposed at a first side of a board of the knob and an inclined surface slides while being in contact with the inclined surface of the first side wall portion and is formed on the guide member.

In some embodiments, the rod may be detachably coupled to the knob, the second connector may be detachably fixed at the tip side of the rod, and/or the connector housing may be configured to detachably couple the second connector at the tip side of the rod.

BRIEF DESCRIPTION OF THE INSERTIONS

The above and other features and advantages of the present invention will become more apparent by describing in detail exemplary embodiments thereof with reference to the attached insertions in which.

DETAILED DESCRIPTION

Advantages and features of the present invention and methods of accomplishing the same may be understood more readily by reference to the following detailed description of exemplary embodiments and the accompanying insertions. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on", "directly connected to" or "directly coupled to" another element or layer, there are no intervening elements or layers present. As used herein, the term "and/or" includes any and all combinations of one or more of the associated listed items.

It will be understood that, although the terms first, second, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Exemplary embodiments are described herein with reference to cross-section illustrations that are schematic illustrations of exemplary embodiments (and intermediate structures). Accordingly, variations from the shapes of the illustrations as a result, for example, of manufacturing techniques and/or tolerances, are to be expected. Thus, these exemplary embodiments should not be construed as limited to the particular shapes of regions illustrated herein but are to include deviations in shapes that result, for example, from manufacturing. For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the present invention.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

Hereinafter, a shift lever of an automotive transmission according to an exemplary embodiment of the present invention will be described in detail with reference to the accompanying illustrative insertions.

Figure 1:
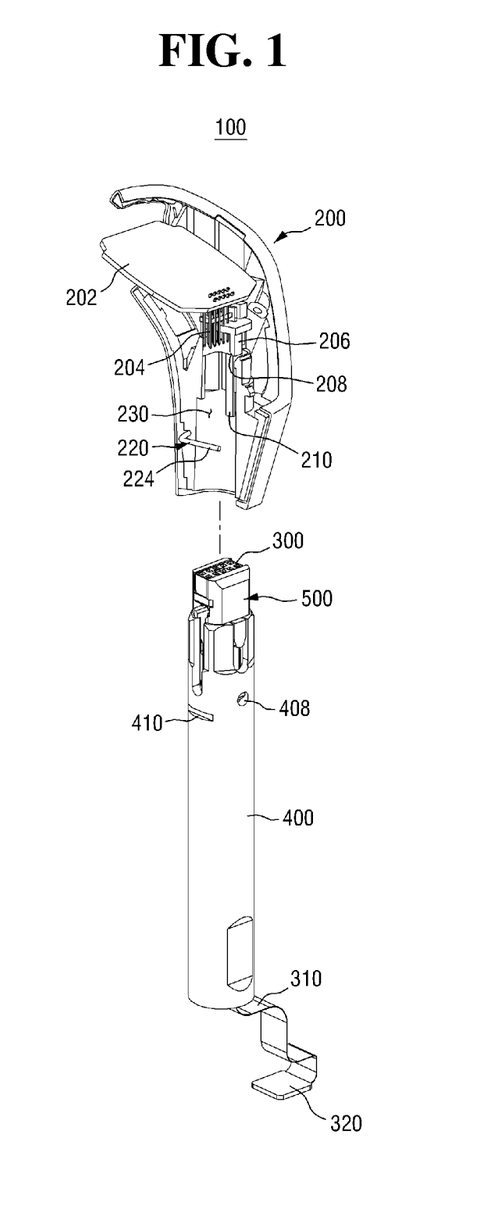
FIG. 1 is an exemplary partial view illustrating a knob and a rod of a shift lever of an automotive transmission according to an exemplary embodiment of the present invention are separated.

FIG. 1 is an exemplary partial view illustrating a knob and a rod of the shift lever of the automotive transmission according to the embodiment of the present invention are separated. As illustrated, a shift lever 100 of the automotive transmission may include a knob 200 which serves as a handle to allow a driver to move the shift lever 100, and a rod 400 which may be mechanically and electrically coupled to the knob 200. Therefore, when the driver moves the knob 200 by gripping the knob 200 with one hand, the rod 400 may be moved in one direction to select a desired gear shift stage.

Moreover, a release button (not illustrated), which may be configured to release a shift lock function that prevents movement of the shift lever 100, may be formed on the knob 200. The shift lever 100 may be prevented from being moved by the shift lock function when the release button is disengaged (e.g., the button is not pressed by a driver), and when the driver presses (e.g., engages) the release button, the shift lock function may be released to allow the shift lever 100 to be moved. The release button may be used for either all of the gear shift stages or for some of the gear shift stages.

In the exemplary embodiment of the present invention, when the release button is formed on the knob 200 to release the shift lock function is described as an example, but this exemplary embodiment is merely an example for helping to understand the present invention, and the present invention is not limited thereto, and various types of buttons such as buttons for changing the gear shift modes may be formed according to use and necessity when the aforementioned various gear shift modes are provided.

The release button prevents the unintended gear shift stage from being selected by the driver, thereby minimizing a possibility of a safety accident of a vehicle due to an erroneous manipulation of the shift lever 100 or a possibility of a sudden unintended acceleration. The shift lever 100 may have a structure for electrically connecting the knob 200 and the rod 400 to transmit a signal based on whether the release button is manipulated. The shift lever 100 according to the exemplary embodiment of the present invention may include a plurality of connectors 204 and 300 formed at one side of each of the knob 200 and the rod 400 and electrically connected to each other when the knob 200 and the rod 400 are coupled, to allow an electrical signal to be transmitted without a separate assembly process when the knob 200 and the rod 400 are coupled.

In the exemplary embodiment of the present invention, the plurality of connectors is referred to as a first connector 204 and a second connector 300, respectively, and a situation in which the first connector 204 is formed on the knob 200 and the second connector 300 is formed on the rod 400 will be described as an example. In particular, a situation in which the first connector 204 is formed at one side of the knob 200 and the second connector 300 is formed on the rod 400 will be described as an example, but this exemplary embodiment is merely an example for helping to understand the present invention, and the present invention is not limited thereto, the first and second connectors may be formed at the opposite sides, and the first and second connectors may be separately configured and coupled to the knob 200 and the rod 400, respectively. A situation in which the first connector 204 and the second connector 300 are formed to transmit a manipulation signal of the release button is described as an example, but the present invention is not limited thereto, and the first connector 204 and the second connector 300 may be used to transmit a signal that corresponds to the type of button formed on the knob 200.

A printed circuit board 202, which outputs an electrical signal in accordance with an operation of pressing the release button, may be disposed inside the knob 200, and the first connector 204 may be connected and formed at one side of the printed circuit board 202. The first connector 204 may have at least one or more connecting pins, and a guide member 206, configured to guide the first connector 204 to allow a substantially smooth coupling between the first connector 204 and the second connector 300 at the rod 400 side, may be formed at one side of the first connector 204. In particular, an inclined surface 208 may be formed at a lower side of the guide member 206, and the inclined surface 208 will be described below.

An accommodating groove 230 into which the second connector 300 at the rod 400 side and a part of a tip of the rod 400 are inserted and accommodated may be formed in the knob 200, and at least one or more guide ribs 210 may be formed on an inner surface that forms the accommodating groove 230. The guide rib 210 may be formed vertically, and may be formed to protrude to have a predetermined thickness inside the accommodating groove 230.

Furthermore, an elastic member 220, which may be configured to maintain horizontality and may have a predetermined amount of elasticity, may be formed in the accommodating groove 230 of the knob 200. The elastic member 220 may have an approximately 'ㄷ' shape, and in this case, any one end (e.g., a first end) of the elastic member 220 may form a fixed end 222 that may be inserted into and fixed to the knob 200, and the other end (e.g., a second end) of the elastic member 220 may form a coupling end 224 positioned in the accommodating groove 230 of the knob 200 and provides elasticity.

Figure 2A:
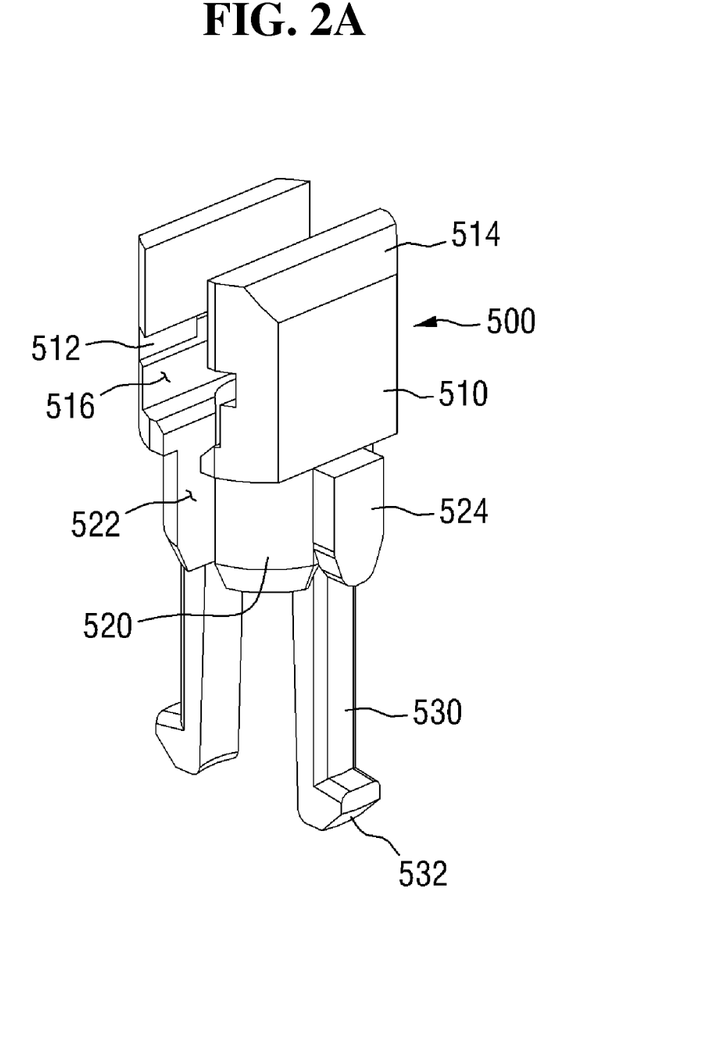
FIGS. 2A and 2B are exemplary views of a connector housing applied to the shift lever of the automotive transmission according to the exemplary embodiment of the present invention.
Figure 2B:
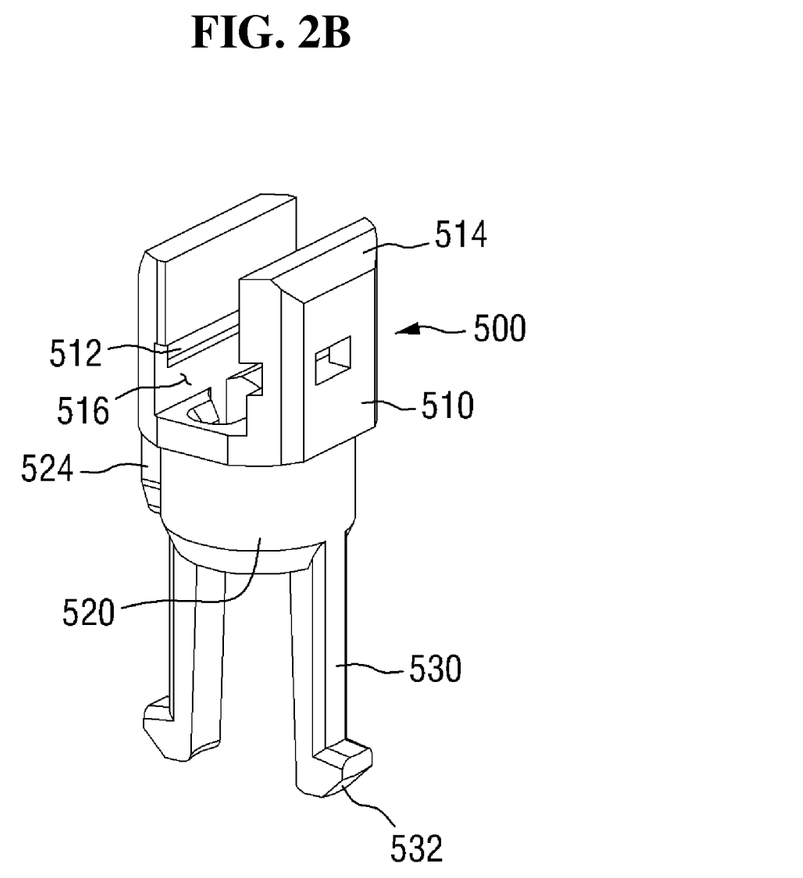
Figure 3:
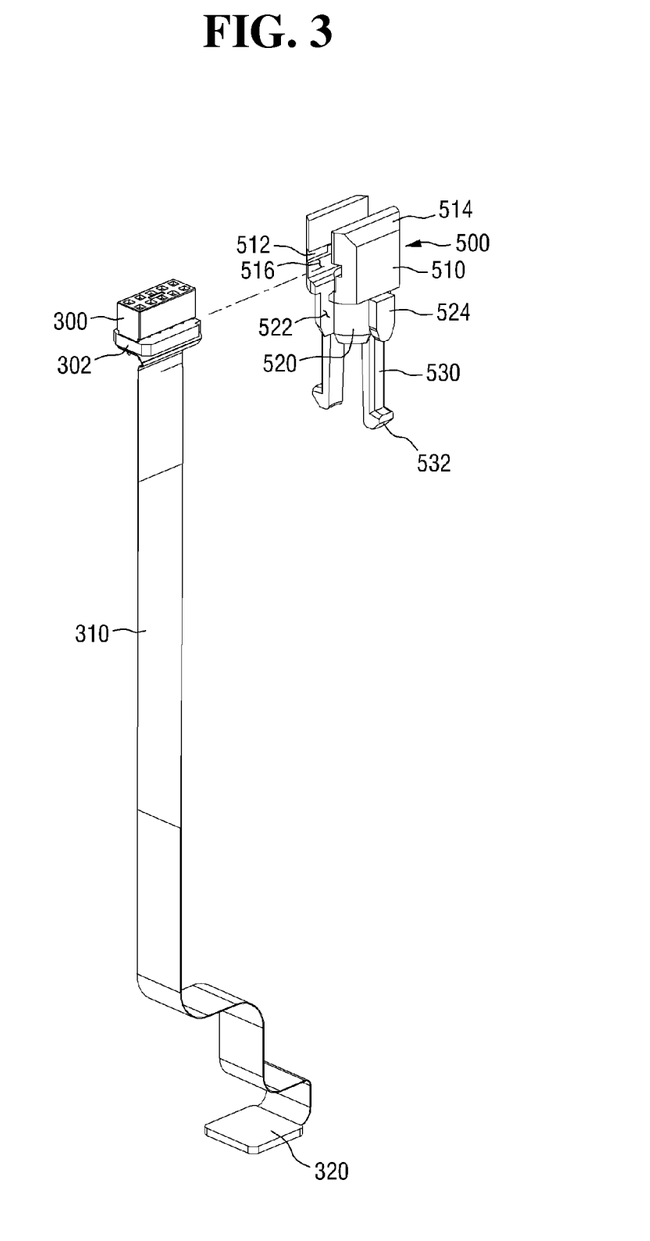
FIG. 3 is an exemplary detailed view illustrating a coupling relationship between a second connector, which is inserted and positioned in the rod, and the connector housing according to an exemplary embodiment of the present invention.
Figure 4:
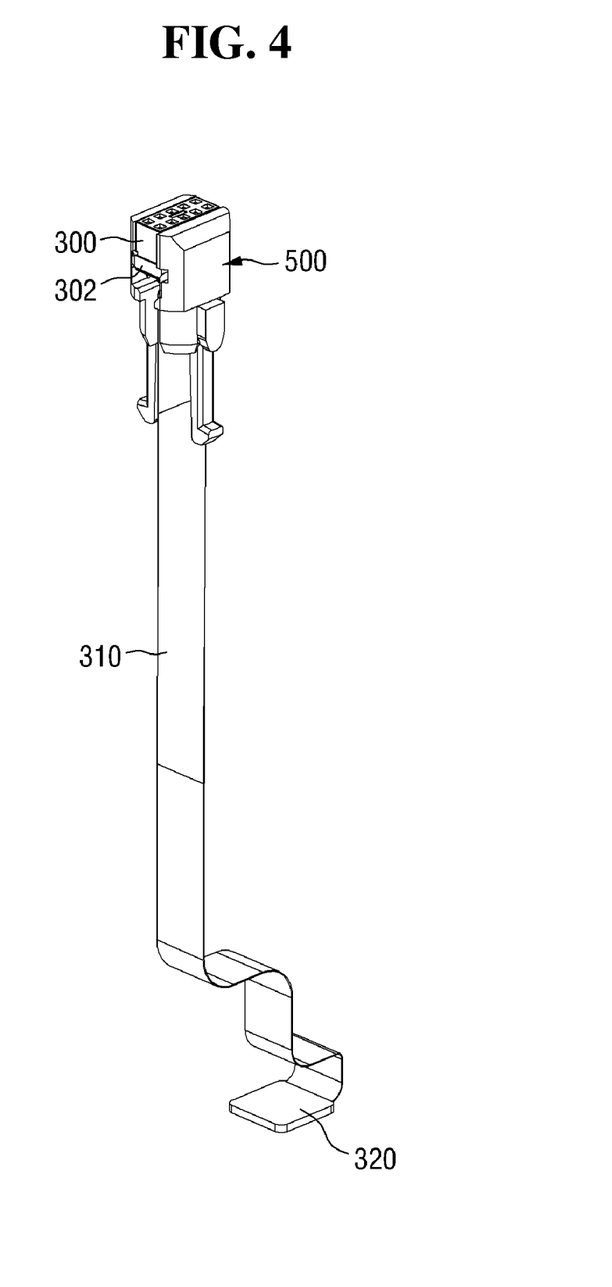
FIG. 4 is an exemplary coupled perspective view of FIG. 3 according to an exemplary embodiment of the present invention.

FIGS. 2A and 2B are exemplary views of a connector housing applied to the shift lever 100 of the automotive transmission according to the exemplary embodiment of the present invention, FIG. 3 is an exemplary detailed view illustrating a coupling relationship between the second connector, which is inserted and positioned in the rod, and the connector housing, and FIG. 4 is an exemplary coupled perspective view of FIG. 3. As illustrated in FIGS. 2A to 4, the second connector 300 may be detachably installed at the tip of the rod 400, and may be connected with a flexible type conductive member 310 having a predetermined length.

In particular, the conductive member 310 may be a board formed of a metallic thin film having conductivity, or may be a wire such as an electric wire, and one end (e.g., a first end) of the conductive member 310 may be fixed to one surface of the second connector 300 by soldering. In addition, a third connector 320, configured to transmit an electrical signal via the second connector 300 and the conductive member 310 to a controller, an instrument panel, or the like, may be disposed at the other end (e.g., a second end) of the conductive member which is opposite to one end at which the second connector 300 may be fixed. For reference, a configuration in which the other end side of the conductive member 310 is bent to have multiple step portions is illustrated as an example in the drawings that support the exemplary embodiment of the present invention, but this illustration is merely a form according to the exemplary embodiment of the present invention, and the other end side of the conductive member 310 may have a rectilinear shape.

The second connector 300 may be installed to be directly detachable to the tip of the rod 400, but may be installed to be detachable by a connector housing 500 as illustrated in FIGS. 2A and 2B. The connector housing 500 may include a body to/from which the second connector 300 may be attached and detached in a sliding manner, and a fastener 530 extended downward from the body and attached to and detached from the rod 400.

The body may include a pair of first side wall portions 510 formed to be spaced apart from each other at a predetermined interval to form an insertion space portion 516 having a predetermined size, and a pair of second side wall portions 520 extended downward from the first side wall portions 510 and formed to be spaced apart from each other at a predetermined interval to form an insertion groove 522 that communicates with the insertion space portion 516. In particular, the second connector 300 may be fitted and positioned in a sliding manner into the insertion space portion 516 formed between the first side wall portions 510, and the flexible type conductive member 310 connected with the second connector 300 may be fitted and positioned in a sliding manner into the insertion groove 522 formed between the second side wall portions 520.

Furthermore, an upper side and a lower side of the insertion space portion 516 between the first side wall portions 510 may be open, and at least any one side of a circumference of the insertion space portion 516 may be open (e.g., any of the sides of the insertion space portion 516 may be open as opposed to forming a closed area). In addition, an upper side of the insertion groove 522 between the second side wall portions 520 may be open to communicate with the insertion space portion 516, at least any one side of a circumference of the insertion groove 522 may be open, and a lower side of the insertion groove 522 may be open to allow the flexible type conductive member 310 to pass therethrough. Specifically, for the first side wall portions 510 and the second side wall portions 520, which form the body, to be formed integrally, any one of front and rear sides of the first side wall portions 510 may not closed and connected to each other, or any one of front and rear sides of the second side wall portions 520 may closed and connected to each other.

In the exemplary embodiment of the present invention, a structure in which the upper sides, the front sides and the rear sides of the first side wall portions 510, which form the insertion space portion 516, are open and not connected to each other is illustrated as an example, and a structure in which the upper sides, the front sides, and the lower sides of the second side wall portions 520 are open and the rear sides of the second side wall portions 520 are connected to each other (see FIG. 2B) is illustrated as an example, but any connection structure may be applied as long as any one of the first side wall portions 510 and the second side wall portions 520 is integrally connected.

The second side wall portions 520 of the body may be inserted into a hollow portion 402 of the rod 400, and the first side wall portions 510 may be exposed at the tip of the rod 400 (e.g. extraneous to the hollow portion 402 of the rod 400). A pair of fasteners 530 may be extended downward from lower surfaces of the second side wall portions 520 at a predetermined length, and specifically, may be extended to be parallel with each other at both sides of the second side wall portions 520. In addition, coupling projections 532, extended outward to oppose each other, may be formed at ends of the fasteners 530. In particular, the pair of fasteners 530 may be made of a plastic material which has a predetermined elasticity itself.

Guide grooves 512 recessed inward at a predetermined depth to be parallel with each other, may be formed horizontally in inner surfaces of the first side wall portions 510 that form the insertion space portion 516, and guide rails 302, which protrude outward to correspond to the guide grooves 512 of the insertion space portion 516, may be formed on both side surfaces of the second connector 300. An inclined surface 514 may be formed at an upper side of the first side wall portion 510 of the body, and the inclined surface 514 may be in contact with (e.g., adjacent to) the inclined surface 208 formed on the guide member 206 of the knob 200.

Therefore, the inclined surface 208 of the guide member 206 of the knob 200 may slide along the inclined surface 514 of the first side wall portion 510, and may be configured to guide the first connector 204 at the knob 200 side and the second connector 300 at the rod 400 side to more easily connect the first connector 204 and the second connector 300 vertically. Locating projections 524, configured to guide the connector housing 500 to fasten the connector housing 500 to the tip of the rod 400 in a forward direction, may be formed to protrude on outer surfaces of the second side wall portions 520 of the body.

Figure 5:
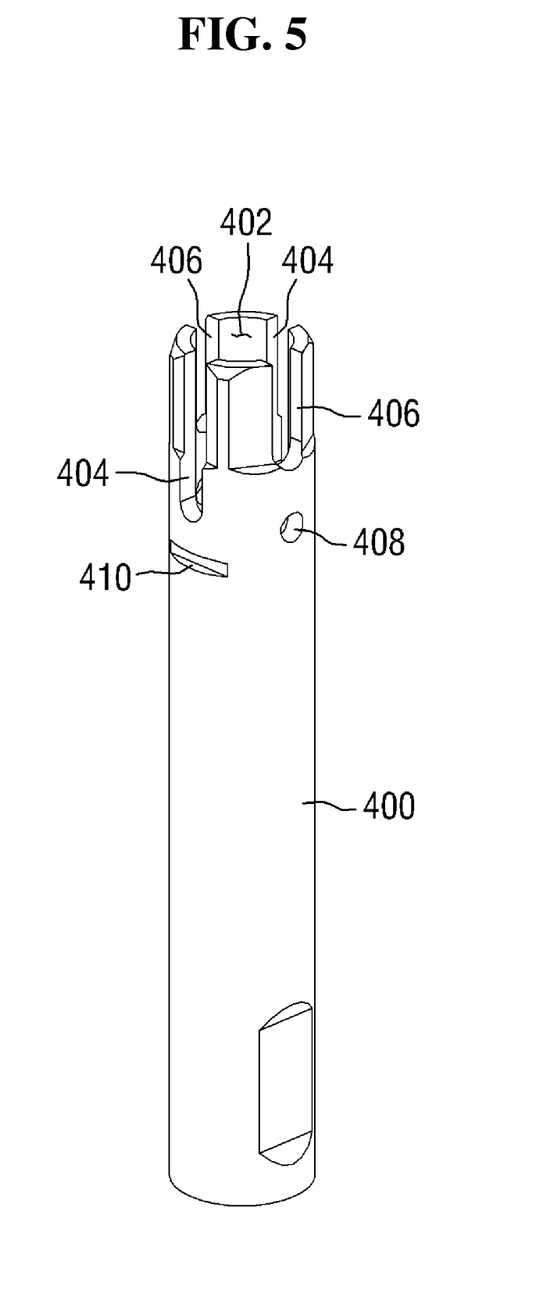
FIG. 5 is an exemplary view illustrating the rod that is applied to the shift lever of the automotive transmission according to the exemplary embodiment of the present invention.

FIG. 5 is an exemplary view illustrating the rod applied to the shift lever of the automotive transmission according to the exemplary embodiment of the present invention. As illustrated in FIG. 5, the rod 400 may have an annular bar shape having a vacant hollow portion 402 therein, and structures for coupling the connector housing 500 and the knob 200 may be formed at the tip of the rod 400.

For example, guide slits 404 may be formed in a circumferential surface to oppose each other at both sides at the tip side of the rod 400, and locating grooves 406 may be formed in the circumferential surface to oppose each other at both sides at positions perpendicular to the guide slits 404. For reference, a configuration in which the pair of guide slits 404 and the pair of locating grooves 406 are formed to oppose each other at both sides is illustrated in the drawings that supports the exemplary embodiment of the present invention, but this configuration is merely an exemplary embodiment of the present invention, and a single guide slit and a single locating groove may be formed in some cases.

In particular, the guide slit 404 may be formed to correspond to the guide rib 210 of the knob 200, and the locating groove 406 may be formed to correspond to the locating projection 524 of the connector housing 500. A notch groove 410, which allows the elastic member 220 installed in the accommodating groove 230 of the knob 200 to be elastically inserted and positioned into the notch groove 410 and has a predetermined depth, may be formed at one side of the circumferential surface of the rod 400. A coupling aperture 408 into which the coupling projection 532 of the fastener 530 of the connector housing 500 is elastically inserted and positioned may be formed at one side of the circumferential surface of the rod 400.

A process of assembling the shift lever 100 for a vehicle, which is configured as described above, will be described below. First, as illustrated in FIG. 3, the flexible type conductive member 310, which has the second end at which the third connector 320 may be installed, is provided, the first end of the conductive member 310 may be fixedly coupled to the second connector 300, and the second connector 300 may be coupled to the connector housing 500.

In other words, the second connector 300 may be inserted into the insertion space portion 516 of the connector housing 500 while horizontally sliding toward the insertion space portion 516. Particularly, the tip of the flexible type conductive member 310 may be inserted into the insertion groove 522 of the connector housing 500 while horizontally sliding toward the insertion groove 522. The guide grooves 512 may be formed in the both inner surfaces of the first side wall portions 510 that form the insertion space portion 516, and the guide rails 302, which correspond to the guide grooves 512, may be formed on both outer surfaces of the second connector 300, and as a result, the guide rails 302 of the second connector 300 may be inserted into the guide grooves 512 of the first side wall portions 510 while horizontally sliding along the guide grooves 512.

Therefore, when the second connector 300 is positioned in the insertion space portion 516, and a portion (e.g., a predetermined section) of the tip of the flexible type conductive member 310 is positioned in the insertion groove 522, the guide rails 302 of the second connector 300 may be restricted (e.g., prevented from moving) by the guide grooves 512 of the second side wall portions 520, to fix the second connector 300 in a vertical direction, that is, a Z-axis direction.

Figure 6:
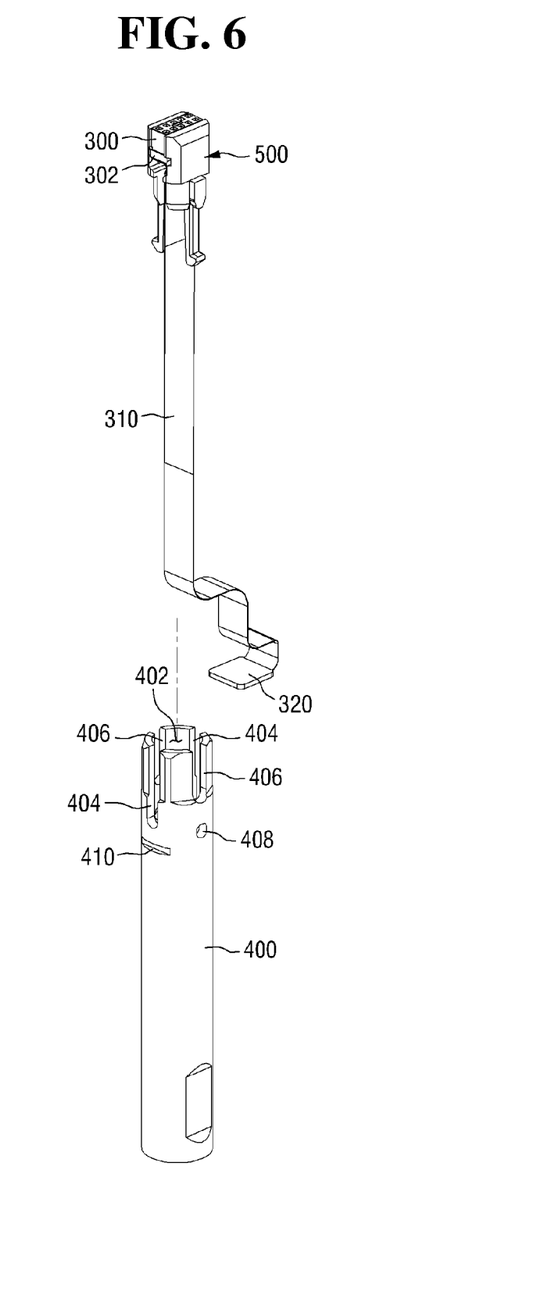
FIG. 6 is an exemplary detailed view illustrating a coupling relationship between the rod, the connector housing, and the second connector according to an exemplary embodiment of the present invention.
Figure 7:
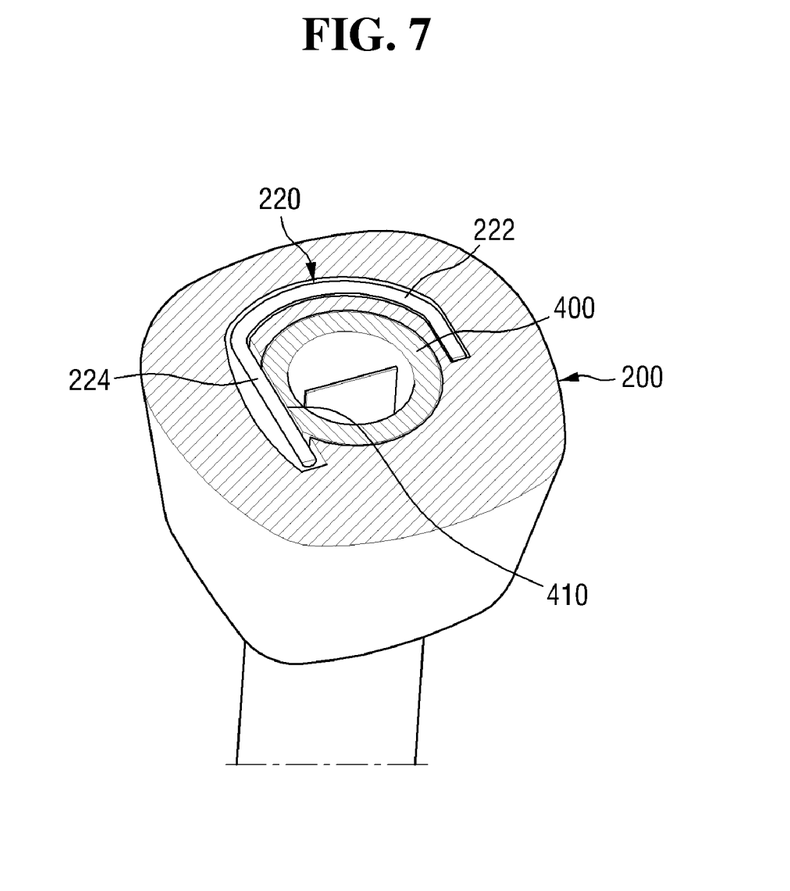
FIG. 7 is an exemplary lateral cross-sectional view illustrating a configuration in which a mutual upward and downward coupled state of the knob and the rod is maintained by an elastic member when the knob and the rod are coupled according to an exemplary embodiment of the present invention.
Figure 8:
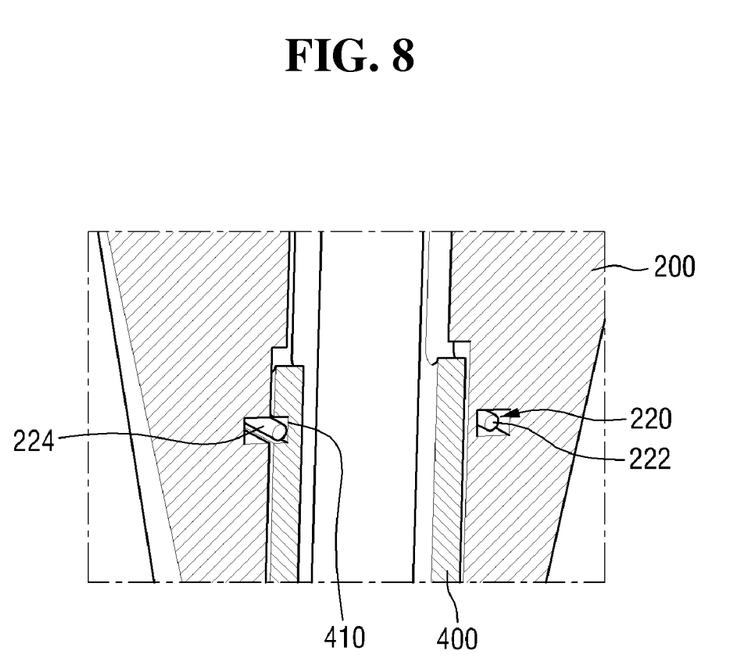
FIG. 8 is an exemplary longitudinal cross-sectional view illustrating a configuration in which the mutual upward and downward coupled state of the knob and the rod is maintained by the elastic member when the knob and the rod are coupled according to an exemplary embodiment of the present invention.

Accordingly, after the second connector 300 and the flexible board 310 are assembled to the connector housing 500, an assembly process of coupling the connector housing 500 to the rod 400 may be performed as illustrated in FIG. 6. In other words, the second end of the flexible type conductive member 310 may be inserted from the tip side of the rod 400, and may pass through the hollow portion 402, to expose the rear end of the flexible type conductive member 310 to the outside through the second end of the rod 400.

Therefore, many parts of the flexible type conductive member 310 except for a part of the second end of the flexible type conductive member 310 may be positioned in the hollow portion 402 of the rod 400, to protect the flexible type conductive member 310 and prevent interference due to friction with other components. As a result, since a separate space is not required to allow the flexible type conductive member 310 to be positioned in the shift lever 100, spatial efficiency may be improved and thus, assembly property may be improved.

Furthermore, the flexible type conductive member 310 may be made of a flexible material, which has conductivity and may be freely deformed within a predetermined range, as described above, such that although the second end of the flexible type conductive member 310 is bent to have multiple stepped portions, there is no obstacle when the flexible type conductive member 310 passes through the hollow portion 402 of the rod 400. As described above, when the second connector 300 has been assembled to the connector housing 500, and the flexible type conductive member 310 has passed through the hollow portion 402 of the rod 400, the connector housing 500 may be coupled to the tip of the rod 400.

An assembly process of coupling the connector housing 500 to the tip of the rod 400 may be performed by pressing the fasteners 530 of the connector housing 500 into the hollow portion 402 from the tip of the rod 400. When the fasteners 530 are pressed into the hollow portion 402 of the rod 400, the fasteners 530 may be pressed into the hollow portion 402 when the fasteners 530 are contracted by the elasticity of the fasteners.

As the fasteners 530 of the connector housing 500 are pressed into the hollow portion 402 from the tip side of the rod 400 as described above, the coupling projections 532 extended at the ends of the fasteners 530, may be pressed inward while sliding along the inner surface of the rod 400, the coupling projections 532 may be continuously pressed and inserted, and then the fasteners 530 may be spread by fastener elasticity when the coupling projections 532 reach the coupling apertures 408 of the rod 400. As a result, the coupling projections 532 may be inserted into and caught by the coupling apertures 408 of the rod 400. Therefore, once substantial external force is not applied to the rod 400, the connector housing 500 is no longer pressed inward, nor is lifted upward, thereby maintaining a state in which the rod 400 and the connector housing 500 are coupled to each other.

Additionally, since the locating projections 524 may protrude outward from the second side wall portions 520 of the body of the connector housing 500, the connector housing 500 may be inserted into the hollow portion 402 of the rod 400 when the locating projection 524 and the locating groove 406 of the rod 400 are positioned on the same vertical line. For example, since two fasteners 530 are provided as the pair of fasteners 530 on the connector housing 500, and two coupling apertures 408 of the rod 400 are disposed to correspond to the coupling projections 532 of the fasteners 530, the assembling process may not be smoothly performed (e.g., creating a more complex assembly process) when the coupling projections 532 of the fasteners 530 and the coupling apertures 408 of the rod 400 are not positioned on the same line.

In particular, since the fasteners 530 are required to be manually rotated leftward and rightward or the fasteners 530 upward are required to be moved and downward to match the coupling projections 532 of the fasteners 530 with the coupling apertures 408 of the rod 400 during the insertion of the fasteners 530 of the connector housing 500 into the hollow portion 402 of the rod 400, the assembly process may become substantially complex.

However, in the exemplary embodiment of the present invention, by the locating projections 524 formed on the connector housing 500, and by the locating grooves 406 formed around the tip of the rod 400, the connector housing 500 and the rod 400 may be coupled at simultaneously without the aforementioned cumbersomeness. In other words, when the fasteners 530 of the connector housing 500 are pressed into the hollow portion 402 of the rod 400 when the locating projections 524 of the connector housing 500 and the locating grooves 406 of the rod 400 are positioned on the same vertical line, the locating projections 524 of the connector housing 500 may be vertically moved along the locating grooves 406 of the rod 400, and as a result, the coupling projections 532 of the fasteners 530 and the coupling apertures 408 of the rod 400 may also be positioned on the same vertical line, such that the connector housing 500 and the rod 400 may be more easily coupled to each other.

When the locating projections 524 of the connector housing 500 and the locating grooves 406 of the rod 400 are not positioned on the same vertical line (e.g., are positioned on different vertical lines or at different positions), the second side wall portions 520 and the fasteners 530 of the connector housing 500 may not be pressed into the hollow portion 402 of the rod 400 due to interference with the locating projections 524, thereby preventing erroneous assembly. In other words, the fasteners 530 may be prevented from being inserted into the hollow portion 402 of the rod 400.

When the second connector 300 to which the flexible type conductive member 310 is coupled is assembled to the connector housing 500, and the connector housing 500 is coupled to the rod 400 as described above, the rod 400 may be mounted and fixed to a base plate (not illustrated). In particular, the third connector 320, installed at the second end of the flexible type conductive member 310 embedded in the hollow portion 402 of the rod 400, may be connected with another connector to allow an electrical signal transmitted through the flexible type conductive member 310 to be transmitted to the controller, the instrument panel or the like.

When the rod 400 is completely assembled to a base board, the knob 200 may be coupled to connect the first connector 204 installed on the knob 200 to the second connector 300 installed at the tip of the rod 400, that is, installed to be surrounded by the connector housing 500. Specifically, as illustrated in FIG. 1, when the knob 200 is moved downward so that a part of the tip of the rod 400 is inserted into the accommodating groove 230 of the knob 200, when the guide rib 210 of the knob 200 and the guide slit 404 of the rod 400 are positioned on the same vertical line, the coupling end 224 of the elastic member 220 installed on the knob 200 may slide along the outer surface of the rod 400 when the coupling end 224 is extended by fastener elasticity. When the coupling end 224 reaches the notch groove 410 of the rod 400 as the elastic member 220 continuously slides, the coupling end 224 may be contracted by fastener elasticity, to couple the knob 200 and the rod 400 (e.g., in a one touch manner as the elastic member is inserted into the notch groove 410 of the rod 400. Therefore, the knob 200 may be fixed and prevented from moving from the rod 400 upward and downward, that is, in the Z-axis direction.

The first connector 204 formed on the board of the knob 200 may be connected with the second connector 300 coupled by the connector housing 500, to allow an electrical signal output from the printed circuit board 202 of the knob 200 to be transmitted to the third connector 320 via the first connector 204, the second connector 300, and the flexible type conductive member 310, and the third connector 320 may be configured to transmit the electrical signal to the controller, the instrument panel or the like by being connected with other connecting terminals and the like.

In particular, the first connector 204 installed on the printed circuit board 202 of the knob 200 and the second connector 300 installed at the tip of the rod 400 by the connector housing 500 may be more easily connected to each other while being guided to form the same vertical line by the guide member 206 installed at the first side of the first connector 204 of the knob 200. In other words, the inclined surface 208 of the guide member 206 installed at one side of the first connector 204 of the knob 200 may slide on the inclined surface 514 formed on the first side wall portion 510 of the connector housing 500 to guide the first connector 204 and the second connector 300 to position the first connector 204 and the second connector 300 on the same vertical line, to more easily connect the first connector 204 and the second connector 300 since the first connector 204 and the second connector 300 may be positioned on the same vertical line without separately adjusting the positions thereof.

Since the guide rib 210 may be formed on the inner circumferential surface that forms the accommodating groove 230 of the knob 200, and the guide slit 404, which corresponds to the guide rib 210, may be formed in the circumferential surface of the tip side of the rod 400, the knob 200 may be moved downward and assembled to the rod 400 when the knob 200 and the rod 400 are positioned on the same vertical line as the guide rib 210 is matched with the guide slit 404, such that the first connector 204 and the second connector 300 may be more easily connected.

The foregoing is illustrative of the present invention and is not to be construed as limiting thereof. Although a few exemplary embodiments of the present invention have been described, those skilled in the art will readily appreciate that many modifications are possible in the exemplary embodiments without materially departing from the novel teachings and advantages of the present invention. Accordingly, all such modifications are intended to be included within the scope of the present invention as defined in the claims. Therefore, it is to be understood that the foregoing is illustrative of the present invention and is not to be construed as limited to the specific embodiments disclosed, and that modifications to the disclosed exemplary embodiments, as well as other embodiments, are intended to be included within the scope of the appended claims. The present invention is defined by the following claims, with equivalents of the claims to be included therein.

What is claimed is:

1. A shift lever of an automotive transmission, comprising:
   a knob;
   a rod coupled to the knob;
   a first connector is installed in the knob;
   a second connector fixed at a tip side of the rod;
   a connector housing configured to couple the second connector at the tip side of the rod; and
   a conductive member having a first end fixed to the second connector, and inserted and accommodated into the rod,
   wherein the rod is formed in an annular bar shape having a hollow portion, and
   wherein the connector housing includes:
      a guide groove to which the second connector is inserted; and
      a fastener extended in one direction from a body of the connector housing, and attached and detached to the rod.

2. The shift lever of claim 1, wherein the conductive member is made of a flexible material.

3. The shift lever of claim 1, further comprising:
an elastic member is disposed on the knob; and
a notch groove into which a first end of the elastic member is inserted and fixed is formed in the rod.

4. The shift lever of claim 3, wherein the first end of the elastic member is fixedly coupled to the knob.

5. The shift lever of claim 1, further comprising:
an accommodating groove into which the rod is inserted and accommodated is formed in the knob;
a guide rib formed on the accommodating groove; and
a guide slit into which the guide rib is inserted is formed in the rod.

6. The shift lever of claim 1, further comprising:
a locating projection protrudes outward and is formed on an outer surface of the connector housing; and
a locating groove into which the locating projection is inserted is formed in the rod.

7. The shift lever of claim 1, further comprising:
a guide rail, which corresponds to the guide groove, is formed on an outer surface of the second connector.

8. The shift lever of claim 1, further comprising:
a coupling projection extended outward and formed on the fastener; and
a coupling aperture into which the coupling projection is inserted and fixed is formed in the rod.

9. The shift lever of claim 1, wherein an inclined surface is formed on the first side wall portion.

10. The shift lever of claim 8, further comprising:
a guide member disposed at a first side of a board of the knob; and
an inclined surface slides while being in contact with the inclined surface of the first side wall portion and is formed on the guide member.

11. The shift lever of claim 1, wherein the rod is detachably coupled to the knob, the second connector is detachably fixed at the tip side of the rod, and the connector housing is configured to detachably couple the second connector at the tip side of the rod.

* * * * *